J. L. MORRIS.
BALL BEARING.
APPLICATION FILED MAR. 9, 1916.
1,210,516.
Patented Jan. 2, 1917.
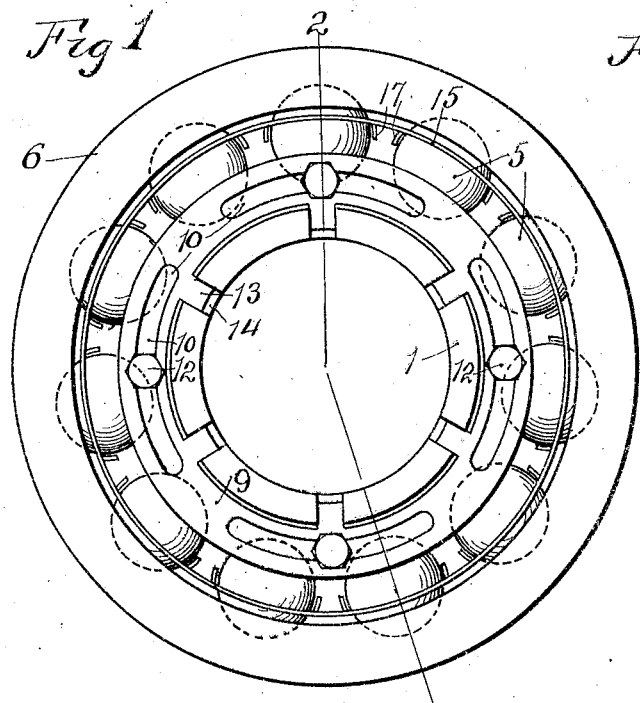
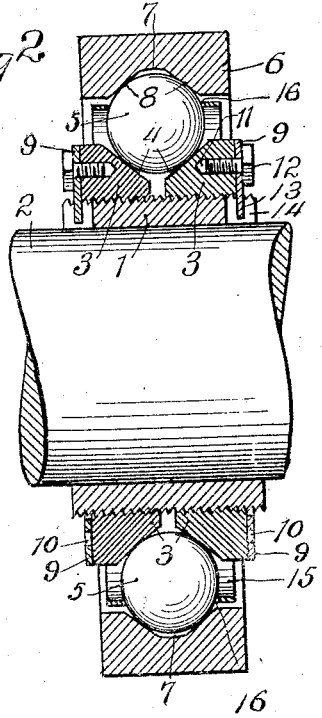
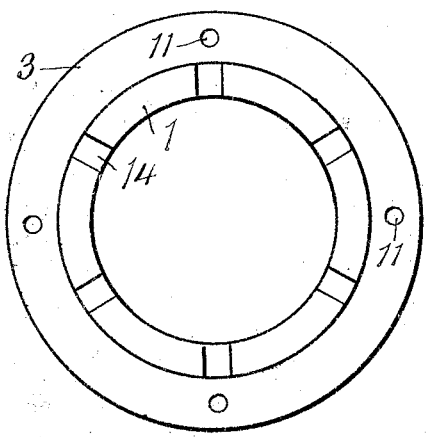
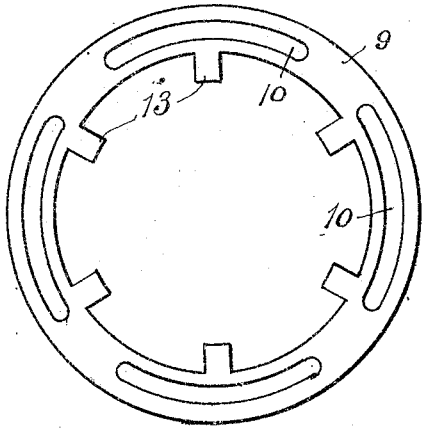
WITNESS
R. E. Hamilton
INVENTOR.
Joseph L. Morris
BY Warren D. House
His ATTORNEY

UNITED STATES PATENT OFFICE.

JOSEPH L. MORRIS, OF LAWRENCE, KANSAS.

BALL-BEARING.

1,210,516.            Specification of Letters Patent.            Patented Jan. 2, 1917.

Application filed March 9, 1916. Serial No. 83,087.

*To all whom it may concern:*

Be it known that I, JOSEPH L. MORRIS, a citizen of the United States, residing at Lawrence, in the county of Douglas and State of Kansas, have invented a certain new and useful Improvement in Ball-Bearings, of which the following is a specification.

My invention relates to improvements in ball bearings.

Preferably it embodies a four point bearing so as to receive end thrust in both directions, as well as to carry a load.

My invention is particularly well adapted for use in supporting heavy loads.

One of the objects of my invention is to provide a ball bearing which may be cheaply manufactured, which will be strong and durable and not liable to get out of order, which may be assembled in operative position independently of and detached from the vehicle or machine with which it is to be used, which may be quickly and accurately adjusted to any desired position, and which, after such adjustment, will be reliably retained in the adjusted position.

Other novel features of my invention are hereinafter fully described and claimed.

In the accompanying drawing, which illustrates the preferred embodiment of my invention, Figure 1 is an elevation of my improved bearing shown provided with a four point bearing. Fig. 2 is a cross section taken on the line 2—2 of Fig. 1, showing the sleeve mounted on a shaft. Fig. 3 is an end elevation of the sleeve and one of the bearing members mounted thereon. Fig. 4 is a plan view of one of the locking members.

Similar reference characters designate similar parts in the different views.

1 designates a central supporting member, which, when the bearing is to be mounted on a shaft 2, comprises a sleeve externally screw-threaded and having adjustably fitted thereon two bearing members comprising each an internally screw-threaded cone ring 3, said rings being provided each with an inclined face 4, the faces forming a ball race for a series of balls 5.

Encircling the bearing members 3 is an annular bearing member 6 provided on its inner side with an annular ball race 7, preferably consisting of a groove having two oppositely inclined conical bearing faces 8.

For releasably locking the bearing members 3 in any position to which they may be adjusted, the following described means is preferably provided.

Releasably secured respectively to the bearing members 3 are two locking members, preferably comprising two flat ring plates 9, each plate being provided with a plurality of arcuate slots 10 arranged in a circle concentric with the sleeve 1 and bearing members 3.

Each member 3 is provided in its outer side with a plurality of threaded holes 11, in which are respectively adapted to be fitted screws 12, which extend respectively through and are circumferentially adjustable in the slots 10 of the adjacent locking plate 9. Each plate 9 is provided with one or more inwardly extending projections 13 which are adapted to be respectively slidably fitted in the adjacent notches 14 with which each end of the sleeve 1 is provided.

The projections 13 are movable in the notches 14 longitudinally of the sleeve 1, but are held by the sleeve from circumferential movement with respect thereto.

The length and arrangement of the slots 10 in the locking members 9 are such that, when the screws 12 are loosened, the bearing members 3 may be circumferentially adjusted to any position, after which the screws 12 are tightened until they securely clamp the locking members 9 to the bearing members 3 respectively. This adjustment having once been made, will be securely retained. In case of wear, it is but necessary to loosen the screws 12, after which the bearing members 3 may be again adjusted accurately to the proper positions, following which the screws 12 are again tightened, so as to securely clamp the locking members to the bearing members to which they are respectively attached.

In the adjustment of my improved bearing, and in assembling the parts, one of the bearing members 3 is mounted on the sleeve 1 and adjusted to its proper position. It is then secured in such position by attaching one of the locking members 9 thereto, by means of screws 12 inserted through the slots 10 respectively and having their heads bearing tightly against the outer side of the member 9. The balls 5 are then placed in the race 7, the member 3 having been adjusted to a position in which the balls 5 will bear against the faces 8 of the bearing member 6 and against the face 4 of the member 3 which has been mounted on the sleeve 1. The other member 3 is then screwed on to the sleeve 1 to a position in which its bearing face 4 will lightly contact with the balls 5. The latter will now have four bearing points comprising the faces 4 and 8. The other locking member 9 is then mounted on the sleeve 1 with the projections 13 in the adjacent notches 14, after which the screws 12 are inserted through the slots 10 and screwed into the adjacent holes 11 until the heads of the screws 12 tightly clamp against the outer side of the member 9 through which the screws extend. The bearing is now properly adjusted and may be applied to the structure with which it is to be used.

Any suitable spacing device may be employed to retain the balls spaced apart. In the drawing, I have shown, for this purpose, an ordinary spacing ring 15, which encircles the members 3 and which is provided with a plurality of holes 16 adapted to respectively receive the balls 5. At opposite sides of the holes 16, the spacing ring 15 is provided with inwardly extending projections 17, Fig. 1.

From the foregoing description, it will be understood that the bearing members 3 are not limited to certain predetermined positions only of adjustment, in which they might occupy only approximately the proper positions, but they may be adjusted to any position upon the sleeve 1, so that they may be accurately positioned in the exact places which they should occupy.

When the bearing has been assembled and adjusted, as above described, it will be adapted for end thrust in both directions as well as for supporting a load and will be particularly well adapted for heavy work.

I do not limit my invention to the structure shown and described, as many modifications, within the scope of the appended claims, may be made without departing from the spirit of my invention.

What I claim is:—

1. In a ball bearing, a threaded supporting member, a locking member having interlocked engagement therewith for holding it against circumferential movement thereon and adjustable longitudinally of said supporting member, a bearing member having threaded engagement with the supporting member, and means for clamping the bearing member to the locking member by which the bearing member may be circumferentially adjusted to and held locked in any position relatively to the supporting member.

2. In a ball bearing, a threaded supporting member, a locking member adjustable longitudinally of said supporting member and having interlocked engagement therewith for holding it against circumferential movement thereon and provided with a slot concentric with the supporting member, a bearing member having threaded engagement with the supporting member and circumferentially adjustable relatively thereto and to the locking member, and clamping means secured to the bearing member and extending through and circumferentially adjustable in said slot for clamping the bearing member to the locking member.

3. In a ball bearing, an externally threaded sleeve, a locking member adjustable lengthwise thereof and having interlocked engagement therewith for holding the locking member against circumferential movement thereon, a bearing member having threaded engagement with said sleeve, and circumferentially adjustable to any position relatively to the sleeve and locking member, and means for clamping the bearing member to the locking member by which the bearing member may be circumferentially adjusted to and held locked in any position relatively to the supporting member.

4. In a ball bearing, a threaded supporting member, a locking member longitudinally adjustable thereon and interlocked therewith against circumferential movement and having a slot concentric with said supporting member, a bearing member having threaded engagement with the supporting member and circumferentially adjustable thereon and provided with a threaded hole, and a clamping screw extending through said slot and fitted in said hole and adapted to releasably clamp the locking and bearing members together.

5. In a ball bearing, an externally threaded sleeve, a locking member longitudinally adjustable thereon and interlocked therewith against circumferential movement and having a slot concentric with said supporting member, a bearing member having threaded engagement with and circumferentially adjustable on said supporting member and provided with a threaded hole, and a screw extending through said slot and fitted in said hole and adapted to releasably clamp the locking and bearing members together.

6. In a ball bearing, a threaded supporting member, a locking member longitudinally adjustable thereon and interlocked therewith against circumferential movement and having a plurality of slots arranged in a circle concentric with said supporting member, a bearing member having threaded engagement with the supporting member, and circumferentially adjustable thereon, and clamping means extending through the slots and circumferentially adjustable therein and secured to the bearing member for clamping the bearing and locking members together.

7. In a ball bearing, a threaded supporting member, a locking member adjustable thereon and interlocked therewith against circumferential movement and having a plurality of slots arranged in a circle concentric with said supporting member, a bearing member having threaded engagement with the supporting member and circumferentially adjustable thereon, and a plurality of screws having threaded engagement with the bearing member and extending respectively through and circumferentially adjustable in said slots for clamping the bearing and locking members together.

8. In a ball bearing, a threaded supporting member having an end notch, a locking member having a projection slidably fitted in said notch for permitting longitudinal adjustment of the locking member and holding it from circumferential movement relatively to the supporting member, a bearing member having threaded engagement with the supporting member and circumferentially adjustable to any position relatively thereto and to the locking member, and releasable means for clamping the bearing member to the locking member by which the bearing member may be circumferentially adjusted to and held locked in any position relatively to the supporting member.

9. In a ball bearing, a threaded supporting member having an end notch, a locking member having a projection slidably fitted in said notch for permitting longitudinal adjustment of the locking member and holding it from circumferential movement relatively to the supporting member, the locking member having a slot concentric with the supporting member, a bearing member having threaded engagement with and circumferentially adjustable on the supporting member, and releasable clamping means secured to the bearing member and extending through and circumferentially adjustable in said slot for clamping the bearing and locking members together.

10. In a ball bearing, a threaded supporting member having an end notch, a locking member having a projection slidably fitted in said notch so as to permit longitudinal adjustment of the locking member on the supporting member and to hold it from circumferential movement thereon, the locking member having a slot concentric with the supporting member, a bearing member having threaded engagement with the supporting member and having a threaded hole, and a releasable clamping screw fitted in said hole and extending through and circumferentially adjustable in said slot for clamping the bearing and locking members together.

11. In a ball bearing, a threaded supporting member having an end notch, a locking member having a projection slidably fitted in said notch so as to permit longitudinal adjustment of the locking member on the supporting member and to hold it from circumferential movement thereon, the locking member having a plurality of slots arranged in a circle concentric with the supporting member, a bearing member having threaded engagement with the supporting member and having a plurality of threaded holes, and a plurality of screws respectively fitted in said holes and respectively extending through and circumferentially adjustable in said slots for releasably clamping the bearing and locking members together.

12. In a ball bearing, a threaded supporting member, two locking members respectively interlocked with the ends of said supporting member so as to be longitudinally adjustable thereon and held from circumferential movement relative thereto, two bearing members having threaded engagement with the supporting member, means for releasably clamping the locking members to the bearing members respectively, so as to permit circumferential adjustment to and locking in any position of the bearing members relative to the supporting member, and an annular bearing member encircling said bearing members and provided on its inner side with an annular ball race.

13. In a ball bearing, a threaded supporting member, two locking members respectively interlocked with the ends thereof so as to be longitudinally adjustable thereon and held from circumferential movement relative thereto, each of said locking members having a slot concentric with the supporting member, two bearing members having threaded engagement with the supporting member, releasable clamping means respectively extending through and circumferentially adjustable in said slots and secured respectively releasably to said bearing members, for clamping the locking members to the bearing members respectively, and an annular bearing member encircling said bearing members and having on its inner side an annular ball race.

14. In a ball bearing, a threaded supporting member having a notch in each end, two locking members, each having a projection, said projections being slidably fitted in said notches so as to permit longitudinal adjustment of the locking members on the supporting member and to hold them from circumferential movement thereon, the locking members each having a slot concentric with the supporting member, two bearing members having threaded engagement with the supporting member, releasable clamping means respectively extending through and circumferentially adjustable in said slots and secured respectively releasably to said bearing members for clamping the locking members to the bearing members respectively, and an annular bearing member encircling said bearing members and provided on its inner side with an annular ball race.

15. In a ball bearing, a threaded supporting member having a notch in each end, two locking members respectively provided with projections slidably mounted in said notches, so as to permit longitudinal adjustment of the locking members on the supporting member and to hold them from circumferential movement thereon, each of said locking members having a plurality of slots arranged in a circle concentric with the supporting member, two bearing members having threaded engagement with said supporting member and provided each with a plurality of threaded holes, screws respectively fitted in said holes and extending through and circumferentially adjustable in said slots and arranged to releasably clamp the locking members to the bearing members respectively, and an annular bearing member encircling said bearing members and having an annular ball race on its inner side.

In testimony whereof I have signed my name to this specification.

JOSEPH L. MORRIS.